US010173642B2

(12) United States Patent
Snider

(10) Patent No.: US 10,173,642 B2
(45) Date of Patent: Jan. 8, 2019

(54) TELEMATICS SYSTEM WITH PIN-CONTROLLED EXTERNAL SIM TO PREVENT VEHICLE PIRACY

(71) Applicant: Continental Automotive Systems, Inc., Auburn Hills, MI (US)

(72) Inventor: James R Snider, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/603,930

(22) Filed: Jan. 23, 2015

(65) Prior Publication Data

US 2016/0214572 A1 Jul. 28, 2016

(51) Int. Cl.
*B60R 25/24* (2013.01)
*H04B 1/3822* (2015.01)
*H04B 1/3816* (2015.01)
*B60R 25/04* (2013.01)
*B60R 25/30* (2013.01)

(52) U.S. Cl.
CPC ............ *B60R 25/241* (2013.01); *B60R 25/04* (2013.01); *B60R 25/30* (2013.01); *H04B 1/3816* (2013.01); *H04B 1/3822* (2013.01)

(58) Field of Classification Search
CPC . B60R 25/241; B60R 25/04; B60R 2025/041; H04B 1/3816; H04B 1/3822
See application file for complete search history.

(56) References Cited

U.S. PATENT DOCUMENTS

| 5,091,856 A | 2/1992 | Hasegawa et al. |
| 2012/0214450 A1* | 8/2012 | Snider .................... H04L 67/12 455/414.1 |
| 2015/0358798 A1* | 12/2015 | Okawa .................... H04W 8/18 455/404.2 |

FOREIGN PATENT DOCUMENTS

KR 1020110136510 A 12/2011

OTHER PUBLICATIONS

EPODOC translation of abstract of KR 1020110136510A.
Search Report dated Oct. 28 2015, from corresponding GB Patent Application No. GB1507252.3.
Machine translation of KR 1020110136510A.

* cited by examiner

*Primary Examiner* — Patrick Edouard
*Assistant Examiner* — Eboni Hughes

(57) ABSTRACT

The operation of a conventional cellular telecommunications transceiver that forms part of a vehicle's telematics system can be selectively changed in order to provide telephone calls by providing the transceiver with a second and different SIM card. Providing a second SIM card, however, will disable telematics service that can include stolen vehicle tracking. A personal identification number or PIN is thus required in order for the information that is stored in an external, user-provided SIM card to be used by a telematics system transceiver rather than the information stored in a built-in SIM card that is provided by a telematics system operator/provider.

9 Claims, 3 Drawing Sheets

TELEMATICS SYSTEM WITH PIN-CONTROLLED EXTERNAL SIM TO PREVENT VEHICLE PIRACY

BACKGROUND

As used herein, the term, telematics refers to technology by which a motor vehicle and its status can be monitored at a remote location by a service provider. Telematics systems also enable a vehicle's location to be tracked, its operation monitored, and its theft detected. General Motors' OnStar® system is one example of a telematics system.

While telematics systems enable tracking and controlling a vehicle from a remote location, they do not currently enable or provide for conventional telecommunications, i.e. voice calls, conducted between a vehicle occupant and someone other than a telematics service provider representative. An apparatus and method for allowing a telematics system in a vehicle to also provide conventional two-way wireless communications would be an improvement over the prior art.

BRIEF SUMMARY

In accordance with embodiments of the invention, the operation of a conventional cellular telecommunications transceiver that forms part of a vehicle's telematics system can be selectively changed in order to provide telephone calls by providing the transceiver with a second and different SIM card. Providing a second SIM card, however, will disable telematics service that can include stolen vehicle tracking. A personal identification number or PIN is thus required in order for the information that is stored in an external, user-provided SIM card to be used by a telematics system transceiver rather than the information stored in a built-in SIM card that is provided by a telematics system operator/provider.

DETAILED DESCRIPTION

Figure 1:
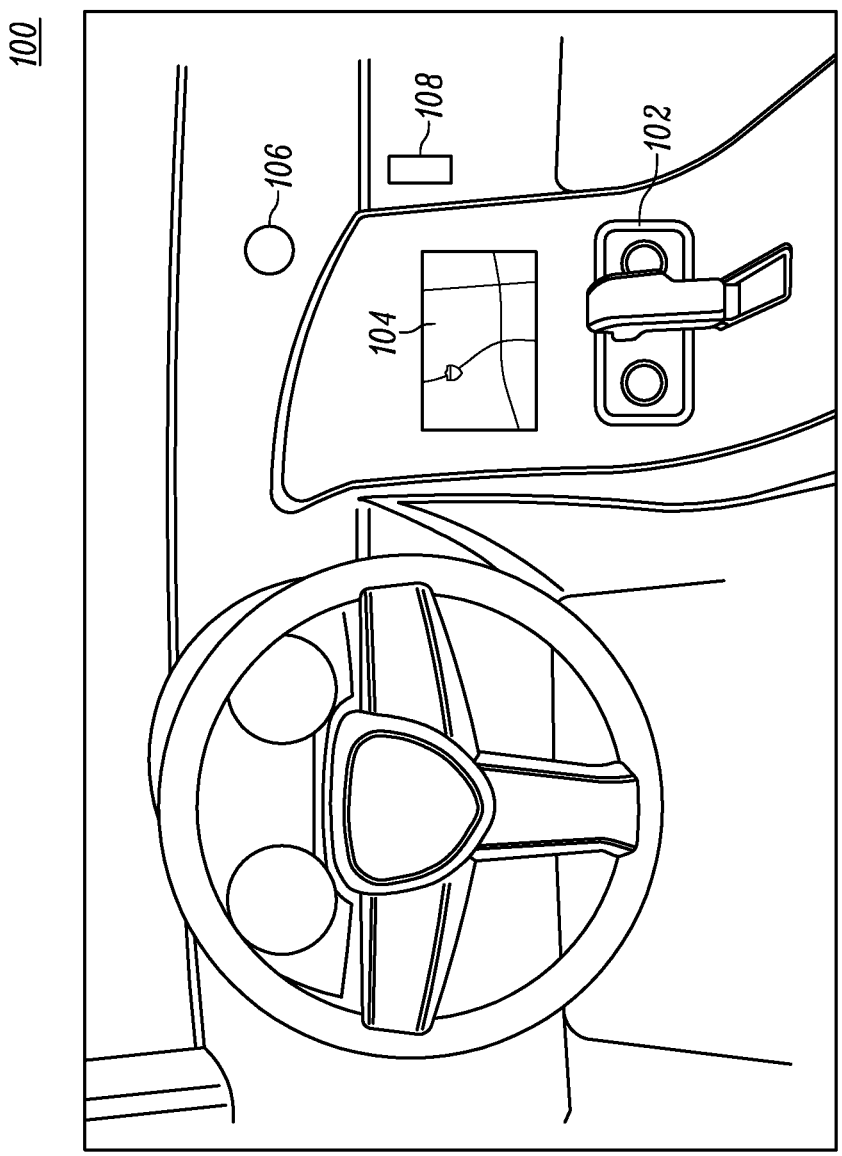
FIG. 1 depicts a motor vehicle dashboard/instrument panel having a user-accessible SIM connector and which is configured to receive a second or auxiliary SIM card for a conventional cellular telecommunications transceiver used with a telematics system.

FIG. 1 depicts a motor vehicle dashboard, also known as an instrument panel. The instrument panel 100 comprises a center console 102 having a touch sensitive display screen 104. The touch-sensitive display screen 104 can display various images, and it can also receive tactile inputs. In one embodiment, the touch-sensitive display screen 104 includes a finger print scanner or reader by which the lines of a person's finger print can be scanned and correlated to a particular individual.

The instrument panel 100 can also include one or more microphones 106, configured to transduce audio signals, including the voice of a passenger inside the vehicle. The display screen 104 and microphone 106 are two examples of user interfaces to a telematics system that is provided to a motor vehicle by the vehicle's manufacturer or as an after-market add-on to a vehicle.

In addition to the display screen 104 and microphone 106, the instrument panel is provided with a user-accessible connector or socket 108. The connector 108 is sized, shaped, and arranged to accept a small circuit board commonly known as a subscriber identity module or "SIM" card, for a cellular telephone.

As is well known, a SIM card stores information, i.e. data, used by certain types of cellular telephones. A SIM card provides an identity or "personality" by which a cell phone is enabled or authorized to provide two-way communications through a service provider.

Figure 2:
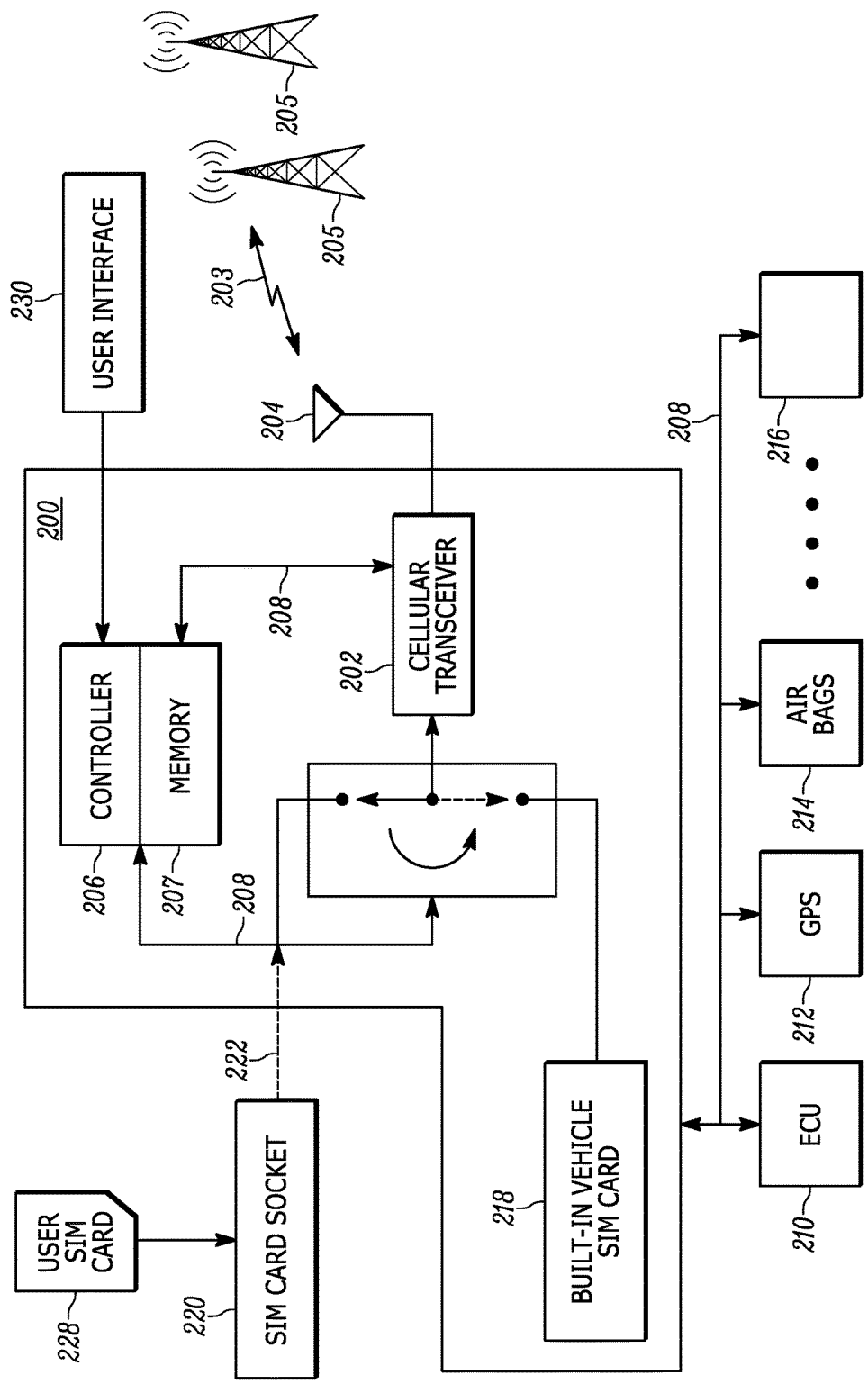
FIG. 2 is a block diagram of a system for receiving a SIM card that is provided to a cellular telecommunications transceiver as part of a telematics system.

FIG. 2 is a block diagram of a vehicle telematics system that will accept a second, external SIM card that will reconfigure or re-purpose a cell phone provided as part of the telematics system 200 but which first requires a personal identification number (PIN) in order for the external SIM card to work with the system 200 and to prevent vehicle theft or piracy. The system 200 is thus referred to as a telematics system with a PIN-controlled external SIM in order to prevent vehicle piracy.

The telematics system 200 comprises a conventional cellular telecommunications transceiver 202 coupled to a conventional antenna 204. The transceiver provides two-way wireless communications through a conventional cellular network, which is well-known and therefore omitted from FIG. 2.

The transceiver 202 is operatively coupled to and controlled by a processor 206 via a conventional Controller Area Network or CAN bus 208. The controller 206 thus controls the transceiver 202 according to instructions stored in a non-transitory memory device 207 coupled to the processor 206 by a conventional address/data/control bus that extends between the processor 206 and the memory device 207.

The telematics system 200 and its transceiver 202 are also coupled to various peripheral devices in the vehicle via the CAN bus 208. Those devices include an engine control unit or ECU 210, a navigation system 212, preferably embodied as a global positioning system, an airbag system 214, and various other peripheral devices 216. By sending and receiving data over the bus 208, the telematics system 200 is able to send information regarding the various peripheral devices to a telematics service provider. It is also able to control the various devices coupled to the bus 208 responsive to instructions stored in its own memory device 207 as well as commands that are received by the system 200 from a telematics service provider.

Transmitting information to and receiving information from a telematics service provider via the transceiver 202 requires information stored in a first subscriber identity module (SIM) that is essentially "hard wired" into the telematics system. In FIG. 2, the built-in or vehicle SIM card is identified by reference numeral 218. As is well-known, the SIM card 218 is an integrated circuit. It typically stores an international mobile subscriber identity (IMSI) and a personal identification number of PIN, both of which are used to identify and authenticate the vehicle to the cellular transceiver 202 and authenticate the cellular transceiver 202 to a wireless service provider that provides a wireless connection between the transceiver 202 and a wireless network via signals and data carried over the wireless network.

Unlike existing vehicle telematics systems, which provide telecommunications between only the vehicle and a telematics service provider, the telematics system 200 shown in FIG. 2 is able to reconfigure the transceiver 202 by selectively providing the transceiver 202 with a second and different SIM card, which is able to store a different IMSI and a different PIN.

As shown in FIG. 1 and in FIG. 2, a user-accessible SIM connector allows for the connection and use of a second SIM card in order to change the "personality" of the transceiver 202, i.e., re-configure the transceiver so it can make calls to and receive calls from entities other than a telematics service provider. When a second and different SIM card is provided to the transceiver 202, the transceiver 202 thereafter provides wireless telecommunications according to the information stored in the different, user-provided SIM card, not according to the information stored in the built-in SIM card 218. Stated another way, telematics services, including stolen vehicle tracking, are stopped while the transceiver 202 is operated using a SIM card other than the SIM card 218 built in to the vehicle. It is therefore important to limit or control when a second, user-supplied SIM card is accepted by the transceiver 202 in order prevent malicious or deliberate disablement of the telematics system 200 and the services provided by the system 200, one of which is tracking a vehicle when it has been stolen.

In FIG. 2, the user-accessible SIM connector 220 is coupled to the telematics system 200 and cellular transceiver via a conventional cable 222 that extends between the connector 220, preferably located on the instrument panel, and the transceiver 202, via an electronic switch 224 operatively coupled to and controlled by the processor 206. Program instructions in the memory 207 cause the controller 206 to monitor the connector 220 for the insertion or presence of a second SIM card 228 in the connector 220. When a second SIM card 228 is detected in the connector 220, other program instructions in the memory device 226 cause the controller to monitor one or more user interfaces 230, preferably a touch-sensitive display panel, for a multi-alphanumeric identifier, which is provided by someone entering the multi-alphanumeric identifier into the user interface 230.

The multi-alphanumeric identifier provided to the user interface in order to enable the transceiver 202 to use the second SIM card 228 is preferably an identifier known only to an authorized user of the second SIM card 228 and which is preferably different from the PIN that is stored in the SIM card 228 itself and which is required by the transceiver 202 to operate. Such a PIN can be considered to be a second SIM authorization PIN.

The nature of a second SIM authorization PIN entered at the user interface 230 is a design choice but an example would be a string of several alphanumeric characters known only to a person to whom valid SIM card information was provided by a cellular telecommunications service provider. A second SIM authorization PIN is thus determined to be "valid" by the system in order to prevent various telematics services from being maliciously disabled. Stated another way, the selective acceptance of a second SIM card 228 by requiring a password or, second SIM card personal identifier (PIN), i.e., a second SIM authorization PIN, limits or controls who can disable the telematics system 200.

When a second SIM authorization PIN, i.e., an identifier for a second SIM card 228 inserted into the connector 220, is received from the user interface 230, and subsequently determined to be a valid identifier, instructions executed by the processor 206 cause the cellular transceiver 202 to thereafter use information from the second SIM card 228 rather than the vehicle SIM card 218. The transceiver 202 for the telematics system 200 will thereafter operate according to data in the second SIM card 228 rather than data in the SIM card 218 built in to the vehicle. By providing the transceiver 202 with a different SIM card, the transceiver 202 can be "re-purposed" to provide conventional calling capability, i.e., the ability to place and receive voice calls to any telephone number. Requiring a valid identifier for a second, user-provided SIM card, however, prevents someone from purposefully stopping telematics services, which services often include stolen vehicle tracking.

Figure 3:
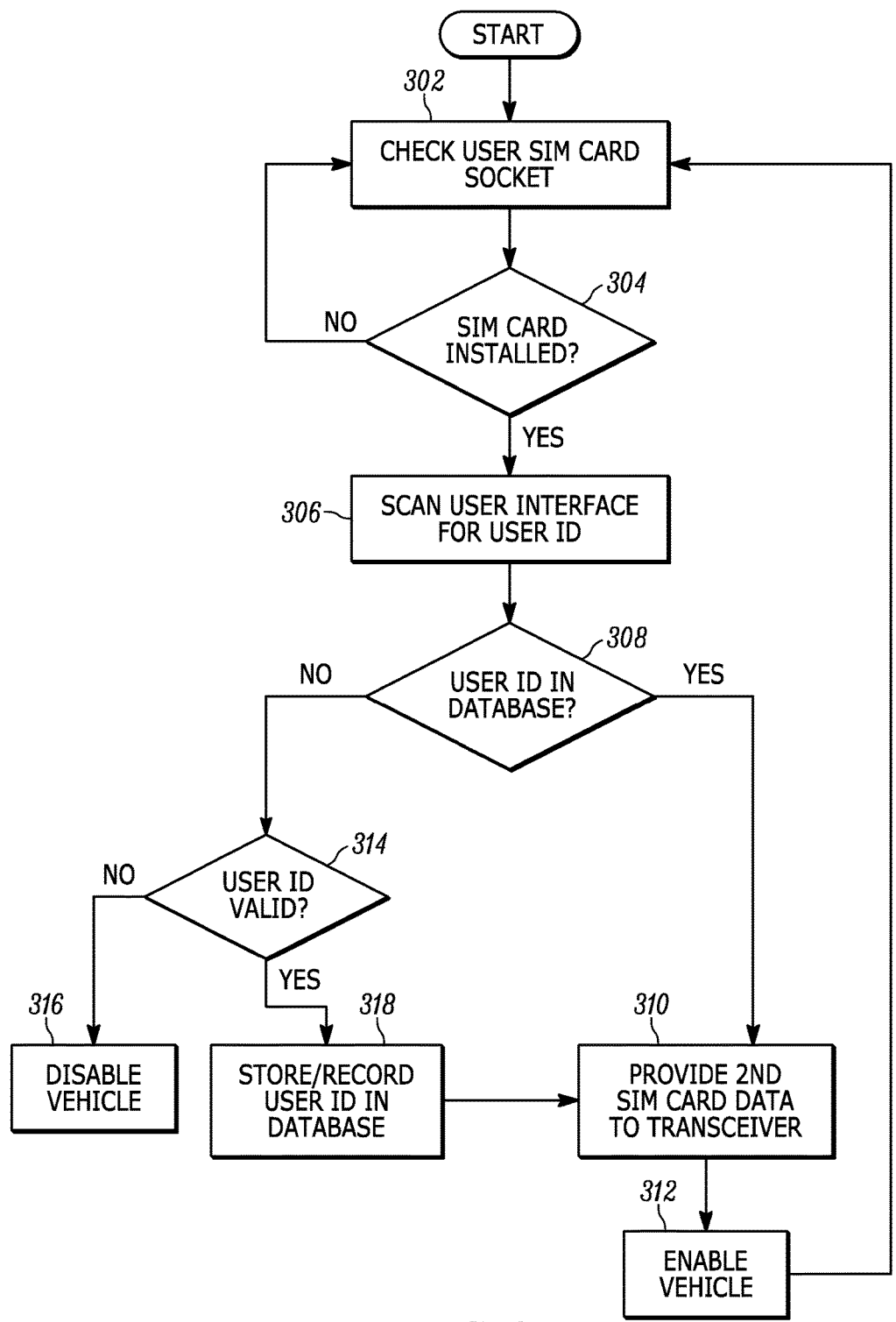
FIG. 3 is a method of selectively enabling operation of a telematics system as well as a vehicle, responsive to receipt of a second, user-provided SIM card.

FIG. 3 is a block diagram depicting steps of a method 300 for controlling the use of an external SIM card by requiring a personal identification number of PIN for a second SIM card 228. In the first two steps 302 and 304, a user-accessible SIM card socket or connector is continuously monitored for the insertion of a second, user-supplied SIM card. When a SIM card is detected in such a connector or socket at step 304, the method 300 proceeds to step 306 where a user interface is scanned for a personal identification number or PIN.

The PIN for the second SIM card 228, i.e., the second SIM authorization PIN, entered at the user interface is preferably an identifier that is different in both length and content from the PIN stored inside a SIM card and which is used by a cell phone to make and receive calls. The successful completion of steps 302, 304, and 306 thus enables the use of the second IMSI and second PIN stored inside a second SIM card 228 that is inserted into a user-accessible SIM card socket.

In an embodiment, the user interface is a touch-sensitive display screen embedded in the instrument panel or dashboard of a vehicle. Such a display screen is depicted in FIG. 1 and identified by reference numeral 102. In a different embodiment, the user interface is a microphone coupled to a processor 206 that executes program instructions that comprise a voice recognition system. In another embodiment, the user interface is a fingerprint scanner which can also be incorporated into and made part of the touch-sensitive display screen.

Regardless of how the user interface is embodied, its purpose and function is to receive information, e.g., a PIN or a biometric characteristic, by which a second SIM card inserted into a user-accessible connector can be determined to be "owned" or controlled by a person whose identity is known to a wireless service provider or who is associated with the SIM card or who is authorized to operate the motor vehicle.

As used herein, the term "associated with" should be construed to mean a person who is an owner or authorized user of the SIM card as determined by a wireless service provider or who is an owner or authorized user of a vehicle in which a telematics system is installed.

After a second SIM authorization PIN or user ID is received through the user interface at step 306, at step 308 the method 300 determines whether the second SIM authorization PIN received through the user interface is stored in a database of known valid identifiers. A database of valid identifiers can be kept in the non-transitory memory device 226 or at a remote location, such as the telematics service provider. In either case, if the PIN or user ID received through the user interface at step 306 is in a valid identifier data base, the method 300 proceeds to step 310 where information in the second SIM card is provided to the cellular transceiver so that the transceiver will thereafter operate as specified by the second SIM card. Such operations by the transceiver can include voice and data calls to any phone number, which would be provided by a conventional cellular transceiver. If the PIN or user ID received at the user interface is not in a valid identifier database and is not otherwise determined to be valid, the transceiver will not operate according to the second SIM but will instead continue to operate using a built-in SIM card.

Those of ordinary skill in the art should recognize that a corollary of providing an invalid user ID through the user interface at step 306 is vehicle disablement. In the method shown in FIG. 3, a vehicle is disabled at step 316 if a valid identifier for the second SIM cards is not provided through the user interface. If on the other hand a valid identifier is provided, the vehicle is "enabled" at step 312 after the second SIM card data is provided to the transceiver at step 310.

In a preferred embodiment, program instructions cause a processor or controller to limit the number of invalid identifiers that can be received from a user interface. In one embodiment, five invalid user identifiers are permitted. Upon receiving a sixth invalid identifier, the engine control unit (ECU) for the vehicle is disabled and requires a system reset from a dealer.

Those of ordinary skill in the art will realize that the apparatus and method depicted in the figures and described above enable the cellular transceiver provided with a telematics system to provide telematics services or conventional wireless telephony services. The selective switching of a vehicle installed SIM card or a user-provided SIM card enables telematics services to be selectively provided at a user's discretion. Requiring a personal identifier or PIN as a condition of using a second, external SIM card can prevent unauthorized shutting off of telematics services.

The foregoing description is for purposes of illustration only. The true scope of the invention is set forth in the following claims.

The invention claimed is:

1. A telematics system for a vehicle, the system comprising:
   a cellular telecommunications transceiver, which is embedded in the vehicle;
   a first subscriber identity module (SIM) having stored therein a first PIN, operatively coupled to the embedded cellular telecommunications transceiver, the first SIM storing information that identifies the vehicle and that enables the embedded cellular telecommunications transceiver to send and receive vehicle-related information to and from a telematics service provider;
   a user-accessible SIM connector coupled to the embedded cellular telecommunications transceiver, the user-accessible SIM connector being configured to receive a second SIM having stored therein a second PIN and being configured to couple the second SIM to the cellular telecommunications transceiver;
   a user interface, which is configured to receive an identifier from a user of the vehicle; and
   a controller operatively coupled to the user interface, the embedded cellular telecommunications transceiver and the user-accessible SIM connector, the controller being configured to detect insertion of a second SIM into the user-accessible SIM connector, receive an identifier from the user-interface;
   wherein the system is configured such that both insertion of the second SIM in the user-accessible SIM connector and input of a valid identifier, which is different from the second PIN and different from the first PIN, via the user interface enables the embedded cellular telecommunications transceiver to send and receive calls to and from a wireless telecommunications provider and disables communications with the telematics service provider and wherein the system is further configured such that insertion of the second SIM in the user-accessible SIM connector without input of the valid identifier via the user interface does not enable the embedded cellular telecommunications transceiver to send and receive calls to and from the wireless telecommunications provider and does not disable communications with the telematics service provider thereby allowing an authorized user to send and receive calls, via the cellular telecommunications transceiver embedded in the vehicle, while preventing unauthorized users from disabling communications with the telematics service provider.

2. The telematics system of claim 1, wherein the controller is configured to disable the vehicle after a second SIM is inserted into the user-accessible SIM connector, an invalid identifier is received from the user interface after the second SIM is inserted into the user-accessible SIM connector, and after the second SIM is removed from the user-accessible SIM connector.

3. The telematics system of claim 1, wherein the controller is configured to receive a predetermined number of invalid identifiers from the user interface and configured to disable the vehicle after the predetermined number of invalid identifies is exceeded.

4. The telematics system of claim 1, wherein the controller is configured to enable the vehicle without receipt of an identifier after the controller receives at least one valid identifier after a second SIM is installed into the user-accessible SIM connector.

5. The telematics system of claim 1, wherein the user interface comprises a touch-sensitive display screen embedded in an instrument panel of the vehicle.

6. The telematics system of claim 1, wherein the user interface comprises a voice-recognition system.

7. The telematics system of claim 1, wherein the user interface comprises a fingerprint scanner.

8. The telematics system of claim 1, wherein the user interface comprises a voice scanner.

9. The telematics system of claim 1, wherein the controller is configured to enable placement of a call to at least one predetermined number after receiving a predetermined number of invalid identifiers from the user interface.

* * * * *